(12) United States Patent
Glück

(10) Patent No.: US 10,745,001 B2
(45) Date of Patent: Aug. 18, 2020

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventor: Christian Glück, Eichstätt (DE)

(73) Assignee: AUDI AG, Ingolstadt (DE)

( * ) Notice: Subject to any disclaimer, the term of this patent is extended or adjusted under 35 U.S.C. 154(b) by 71 days.

(21) Appl. No.: 16/178,913

(22) Filed: Nov. 2, 2018

(65) Prior Publication Data

US 2019/0193719 A1 Jun. 27, 2019

(30) Foreign Application Priority Data

Dec. 21, 2017 (DE) .......................... 10 2017 223 488

(51) Int. Cl.
*B60K 1/02* (2006.01)
*B60W 20/40* (2016.01)
(Continued)

(52) U.S. Cl.
CPC ............ *B60W 20/40* (2013.01); *B60K 1/02* (2013.01); *B60K 6/26* (2013.01); *B60K 6/36* (2013.01);
(Continued)

(58) Field of Classification Search
CPC ...... B60W 20/40; B60W 20/20; B60W 20/30; B60W 30/18027; B60W 10/08;
(Continued)

(56) References Cited

U.S. PATENT DOCUMENTS 7,150,698 B2 12/2006 Sakamoto et al.
2013/0337973 A1* 12/2013 Maass .................. B60W 10/02
477/5

(Continued)

FOREIGN PATENT DOCUMENTS

DE 10133695 A1 3/2002
DE 10218186 A1 11/2003
(Continued)

OTHER PUBLICATIONS

Examination Report dated Aug. 17, 2018 in corresponding German Application No. 102017223488.1; 10 pgs.
(Continued)

*Primary Examiner* — David J Hlavka
(74) *Attorney, Agent, or Firm* — Maier & Maier, PLLC

(57) ABSTRACT

A method for operating a drive device for a motor vehicle with an internal combustion engine and a dual clutch transmission. In a starting operation of the drive device directed at a startup of the motor vehicle, an electric machine coupled to a first input shaft is used, when the first shift clutch is at least partially engaged and the first sub-transmission is disengaged and when the second shift clutch is at least partially engaged and the second sub-transmission is engaged, for providing at the output shaft a starting torque used for starting the internal combustion engine and a drive torque directed at the startup of the motor vehicle, and/or in that, in the starting operation, the internal combustion engine is operated, when the second shift clutch is at least partially engaged and the second sub-transmission is engaged.

10 Claims, 1 Drawing Sheet

(51) Int. Cl.
| | |
|---|---|
| *B60W 30/188* | (2012.01) |
| *B60W 20/00* | (2016.01) |
| *B60W 10/08* | (2006.01) |
| *B60K 6/48* | (2007.10) |
| *B60K 6/44* | (2007.10) |
| *B60W 30/18* | (2012.01) |
| *B60W 20/30* | (2016.01) |
| *B60K 6/50* | (2007.10) |
| *B60W 20/20* | (2016.01) |
| *B60K 6/26* | (2007.10) |
| *B60K 6/36* | (2007.10) |
| *B60K 6/387* | (2007.10) |
| *B60K 6/40* | (2007.10) |
| *B60K 6/547* | (2007.10) |
| *B60W 10/02* | (2006.01) |
| *B60W 10/06* | (2006.01) |
| *B60W 10/113* | (2012.01) |
| *B60W 30/192* | (2012.01) |
| *F16H 3/00* | (2006.01) |
| *F16D 21/02* | (2006.01) |

(52) U.S. Cl.
CPC .............. *B60K 6/387* (2013.01); *B60K 6/40* (2013.01); *B60K 6/44* (2013.01); *B60K 6/48* (2013.01); *B60K 6/50* (2013.01); *B60K 6/547* (2013.01); *B60W 10/02* (2013.01); *B60W 10/06* (2013.01); *B60W 10/08* (2013.01); *B60W 10/113* (2013.01); *B60W 20/00* (2013.01); *B60W 20/20* (2013.01); *B60W 20/30* (2013.01); *B60W 30/18027* (2013.01); *B60W 30/1886* (2013.01); *B60W 30/192* (2013.01); *F16H 3/006* (2013.01); *B60K 2006/262* (2013.01); *B60K 2006/268* (2013.01); *B60K 2006/4808* (2013.01); *B60K 2006/4816* (2013.01); *B60K 2006/4825* (2013.01); *B60W 2510/0208* (2013.01); *B60W 2510/0216* (2013.01); *B60W 2510/0657* (2013.01); *B60W 2510/083* (2013.01); *B60W 2710/021* (2013.01); *B60W 2710/023* (2013.01); *B60W 2710/0666* (2013.01); *B60W 2710/083* (2013.01); *B60W 2710/1005* (2013.01); *B60W 2710/30* (2013.01); *B60Y 2200/92* (2013.01); *B60Y 2300/192* (2013.01); *F16D 21/02* (2013.01)

(58) Field of Classification Search
CPC ............ B60W 20/00; B60W 30/1886; B60W 10/113; B60W 10/06; B60W 10/02; B60W 2510/083; B60W 2510/0216; B60W 2710/023; B60W 2510/0657; B60W 2710/30; B60W 2710/1005; B60W 2710/083; B60W 2710/0666; B60W 2710/021; B60W 2510/0208; B60K 1/02; B60K 6/50; B60K 6/44; B60K 6/48; B60K 6/547; B60K 6/40; B60K 6/387; B60K 6/36; B60K 6/26; B60K 2006/262; B60K 2006/4525; B60K 2006/4808; B60K 2006/4816; B60K 2006/268; F16H 3/006; F16D 21/02; B60Y 2300/192; B60Y 2200/92

See application file for complete search history.

(56) References Cited

U.S. PATENT DOCUMENTS

| | | | |
|---|---|---|---|
| 2015/0119190 A1* | 4/2015 | Isomura | B60W 20/20 477/3 |
| 2016/0167658 A1* | 6/2016 | Mair | B60W 30/18027 701/53 |
| 2016/0167664 A1* | 6/2016 | Mair | B60W 10/113 701/51 |
| 2017/0101085 A1* | 4/2017 | Yoon | B60W 10/06 |
| 2018/0029461 A1* | 2/2018 | Choi | F16H 3/12 |
| 2018/0244262 A1* | 8/2018 | Ruybal | B60K 6/387 |

FOREIGN PATENT DOCUMENTS

| | | |
|---|---|---|
| DE | 103 05 639 A1 | 3/2004 |
| DE | 102005048938 A1 | 4/2007 |
| DE | 102010004711 A1 | 7/2011 |
| DE | 102010017760 A1 | 1/2012 |
| DE | 102012205823 A1 | 10/2013 |
| EP | 1714817 A1 | 10/2006 |
| EP | 2289751 A1 | 3/2011 |

OTHER PUBLICATIONS

European Search Report dated Mar. 22, 2019, in connection with corresponding EP Application No. 18 20 1218.7 (12 pgs., including machine-generated English translation).

Examination Report dated May 14, 2020, in corresponding European application No. 18 201 218.7 including partial machine-generated English language translation; 8 pages.

* cited by examiner

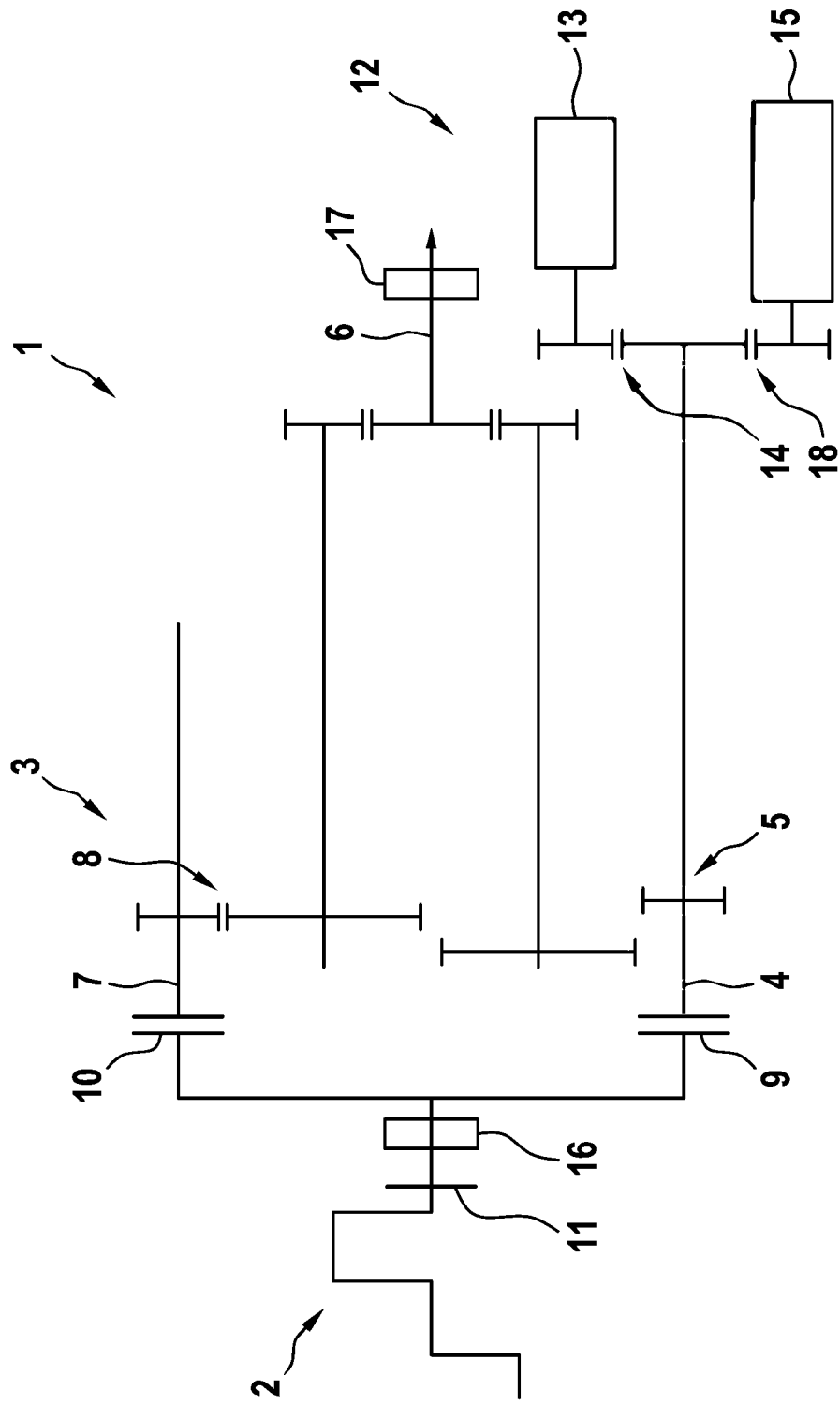

METHOD FOR OPERATING A DRIVE DEVICE FOR A MOTOR VEHICLE AND CORRESPONDING DRIVE DEVICE

FIELD

The invention relates to a method for operating a drive device for a motor vehicle with an internal combustion engine and a dual clutch transmission, wherein the dual clutch transmission has a first input shaft, a second input shaft, and an output shaft, and the first input shaft is connected via a first sub-transmission and the second input shaft is connected via a second sub-transmission to the output shaft, and wherein the internal combustion engine is connected via a first shift clutch to the first input shaft and via a second shift clutch to the second input shaft. The invention further relates to a drive device for a motor vehicle.

BACKGROUND

Known from the prior art is, for example, the publication DE 102 18 186 A1. It relates to a method for controlling a starting operation of a vehicle with a dual clutch transmission, which comprises a first sub-transmission and a second sub-transmission, wherein each sub-transmission has a plurality of engageable gear steps and the first sub-transmission can be in drive connection through a first clutch and the second sub-transmission through a second clutch to a drive motor. In this case, it is provided that, during the starting operation, the second clutch is closed or engaged until it transmits at least a part of the torque transmitted from the drive motor to the drive with slip in order to relieve the first clutch.

SUMMARY

The object of the invention is to propose a method for operating a drive device for a motor vehicle that has advantages in comparison to known methods and, in particular, makes possible a rapid and smooth startup of the motor vehicle.

In this case, it is provided that, in a starting operation of the drive device directed at a startup of the motor vehicle, an electric machine coupled to the first input shaft is used, when the first clutch is at least partially engaged and the first sub-transmission is disengaged and when the second shift clutch is at least partially engaged and the second sub-transmission is engaged, for providing at the output shaft a starting torque used for starting the internal combustion engine and a drive torque directed at startup of the motor vehicle, and/or that, in the starting operation, the internal combustion engine is operated when the second shift clutch is at least partially engaged and the second sub-transmission is engaged for driving an electric generator and for providing the drive torque at the output shaft, and, by means of the generator, supplied electrical energy is used for the additional driving of the output shaft by an electric motor coupled to the output shaft.

The drive device serves for driving the motor vehicle and in this regard, therefore, for providing a torque directed at driving the motor vehicle. For providing the torque, the drive device is equipped with the internal combustion engine. Said internal combustion engine is connected to at least one wheel axle of the motor vehicle via the dual clutch transmission, so that at least one wheel of the wheel axle can be driven via the dual clutch transmission by means of the internal combustion engine. The dual clutch transmission is equipped with the first input shaft and the second input shaft.

The two input shafts are each connected to the internal combustion engine via a shift clutch and, in this regard, can be coupled operatively to the internal combustion engine. Provided between the first input shaft and the internal combustion engine is the first shift clutch and provided between the second input shaft and the internal combustion engine is the second shift clutch. If the respective shift clutch is at least partially engaged, then a torque is transmitted between the internal combustion engine and the respective input shaft. If, in contrast, the shift clutch is completely opened or disengaged, then the operative connection between the internal combustion engine and the respective input shaft is severed.

In addition to the two input shafts, the dual clutch transmission is equipped with the output shaft, which is coupled to or can be coupled to the at least one wheel axle or to the at least one wheel of the wheel axle. For example, the output shaft is permanently connected to the wheel of the wheel axle via, for example, a center differential and/or an axle differential. In the case of the center differential, the output shaft of the dual clutch transmission is connected to a plurality of wheel axles, with it being possible to provide an axle differential in each case between the center differential and the respective wheel axle.

In the scope of this description, two approaches for accelerating a starting operation of the motor vehicle are proposed. In each case, however, the drive device is operated in the starting operation for startup of the motor vehicle. In a first embodiment of the invention, it is provided that, in the starting operation, when the first shift clutch is at least partially engaged and the first sub-transmission is disengaged and when the second shift clutch is at least partially engaged and the second sub-transmission is engaged, the electric machine coupled to the first input shaft is used for providing at the output shaft the starting torque used for starting the internal combustion engine and the drive torque directed at the startup of the motor vehicle.

In this regard, the startup of the motor vehicle should be commenced when the internal combustion engine is at a standstill and is started during the startup. Starting of the internal combustion engine is understood here to mean the increase in the rotational speed of the internal combustion engine in the direction of its idling speed, in particular, starting from standstill of the internal combustion engine. For increasing the rotational speed of the internal combustion engine, the starting torque is applied to it. The starting torque is generated by means of the electric machine, which is connected or coupled to the first input shaft of the dual clutch transmission.

Preferably, the electric machine is coupled rigidly and/or permanently to the first input shaft. This means that, for starting the internal combustion engine or for applying the starting torque at the internal combustion engine, the first shift clutch is at least partially engaged and, in particular, is completely engaged. In order to avoid a direct operative connection between the first input shaft and the output shaft, the first sub-transmission is disengaged. This is understood to mean that no gear is engaged at the first sub-transmission, but instead the first sub-transmission is in neutral.

For providing the drive torque at the output shaft of the dual clutch transmission, the torque provided by the electric machine is transmitted initially via the first shift clutch to the internal combustion engine and additionally via the at least partially engaged second shift clutch to the second input shaft. Because, at the same time, the second sub-transmission is engaged, that is, a gear, in particular a starting gear, is engaged, the torque is transmitted in the form of the drive torque from the second input shaft to the output shaft and is available there for the startup or acceleration of the motor vehicle.

A procedural approach of this kind makes possible, in particular, a continuous operation of an auxiliary assembly, which is operatively connected to the electric machine, at least intermittently, and preferably permanently. When the motor vehicle is at a standstill, that is, prior to the startup of the motor vehicle, the first shift clutch is disengaged and the first sub-transmission is disengaged. In addition, the internal combustion engine is at a standstill. The auxiliary assembly coupled to the electric machine can then be driven by means of the electric machine. For example, in this case, the first input shaft co-rotates freely.

It could then be provided that the startup of the motor vehicle is to be accomplished by engagement of the first sub-transmission by means of the electric machine, that is, by coupling the first input shaft directly to the output shaft via the first sub-transmission. At the same time, through at least partial engaging of the first shift clutch, the starting torque could be applied at the internal combustion engine for starting it. For this purpose, however, it would be necessary initially to reduce the rotational speed of the electric machine and consequently of the auxiliary assembly, in particular, to a standstill. Only subsequently can the first sub-transmission be engaged.

In order to prevent the standstill of the auxiliary assembly entailed by such a procedural approach, the procedural approach outlined above is then carried out, that is, both the first shift clutch and the second shift clutch are at least partially engaged, with the first sub-transmission being disengaged and the second sub-transmission being engaged. By way of a procedural approach of this kind, the auxiliary assembly can be operated continuously, even though the electric machine serves, at the same time, for starting the internal combustion engine and for startup of the motor vehicle. In addition, a direct response of the motor vehicle is realized, so that an outstanding response behavior is present.

Additionally or alternatively, in a second embodiment, it can be provided that, in the starting operation of the drive device directed at the startup of the motor vehicle, when the second shift clutch is at least partially engaged and the second sub-transmission is engaged, the internal combustion engine is operated for driving the electric generator and for providing the drive torque at the output shaft and the electrical energy supplied by means of the generator is used for additionally driving the output shaft by the electric motor coupled to the output shaft.

It is therefore provided that both the output shaft and the electric generator are driven by means of the internal combustion engine. For this purpose, the second shift clutch is at least partially engaged and the second sub-transmission is engaged. Preferably, in addition, the first shift clutch is completely disengaged and/or the first sub-transmission is disengaged. Solely for purposes of completeness, it is noted that the opposite procedural approach can also be realized, in that, therefore, the first shift clutch is at least partially engaged and the first sub-transmission is engaged, whereas the second shift clutch is completely disengaged and/or the second sub-transmission is disengaged.

In this regard, the torque provided by the internal combustion engine is distributed between the drive torque and the torque required for driving the generator. This means that the entire torque provided by the internal combustion engine is not transmitted via the dual clutch transmission, but rather is partially taken up by the electric generator. The energy supplied by the generator is used for operation of the electric motor, which is coupled to the output shaft, preferably rigidly and/or permanently.

In other words, the output shaft is not driven solely by means of the internal combustion engine via the dual clutch transmission, but rather, in addition, by the electric motor. Such a procedural approach is beneficial, in particular, when the second shift clutch is designed solely for transmission of a part of the torque that is maximally provided by the internal combustion engine during startup of the motor vehicle. In any case, a part of the torque provided by the internal combustion engine can be employed for driving the output shaft, with circumvention of the dual clutch transmission and consequently, with circumvention of the second shift clutch.

In this regard, the internal combustion engine is connected to the output shaft, on the one hand, directly via the dual clutch transmission and only indirectly via the generator and the motor. By use of the described procedural approach, a high drive torque at the output shaft is available for startup of the motor vehicle.

Obviously, it is also possible to combine the two named embodiments with each other. For this purpose, in accordance with the first embodiment, for example, the electric machine is coupled to the input shaft. It can then be provided that the first shift clutch is engaged when the first sub-transmission is disengaged and, after its startup by means of the electric machine, the internal combustion engine is used for driving said electric machine. In this regard, the electric machine in accordance with the first embodiment serves as a generator in accordance with the second embodiment. It is provided in this case that the two embodiments are carried out in succession during startup of the motor vehicle. Initially, the first embodiment is used in order to start or turn on the internal combustion engine and to initiate the startup of the motor vehicle, that is, to provide a drive torque at the output shaft.

After starting the internal combustion engine, preferably the second embodiment is carried out and in this regard, therefore, a switch from the first embodiment to the second embodiment is carried out. In the latter, the internal combustion engine drives directly both the output shaft via the dual clutch transmission, namely, via the second shift clutch, and the second sub-transmission. At the same time, the internal combustion engine is used for driving the electric machine, which serves as a generator. The electrical energy supplied by means of the generator or the electric machine is used for the operation of the motor, which additionally drives the output shaft. Accordingly, both an interruption-free operation of the auxiliary assembly and an especially good acceleration of the motor vehicle are ensured.

Another embodiment of the invention provides that, in an auxiliary assembly operation, at least one auxiliary assembly is driven by means of the electric machine when the first shift clutch is disengaged and the first sub-transmission is disengaged. This was already fundamentally addressed in the preceding discussion. The driving of the auxiliary assembly by means of the electric machine is carried out in the auxiliary assembly operation, in which, preferably, the internal combustion engine is deactivated, that is, shut down. In the auxiliary assembly operation, the electric machine therefore serves exclusively for the operation of the at least one auxiliary assembly.

The auxiliary assembly can fundamentally be designed in any way. For example, the auxiliary assembly is present in the form of an air conditioner compressor or the equivalent. The auxiliary assembly is fundamentally integrated in the drive device in such a way that it can be driven both by means of the internal combustion engine and by means of the electric machine. This is based, in particular, on the fact that the auxiliary assembly—for example, in the case of its embodiment as an air conditioner compressor—has a high rated power.

If the auxiliary assembly needs to be driven permanently by means of the electric machine, whereas the internal combustion engine is at a standstill, then the electrical energy must be taken from an energy storage unit. On account of the high rated power of the auxiliary assembly, the energy storage unit would become quickly drained. For this reason, the auxiliary assembly should be driven by means of the internal combustion engine, provided that the latter is in operation, that is, has a rotational speed that differs from zero. For this purpose, the auxiliary assembly, like the electric machine, is preferably coupled to the first input shaft, namely, in particular, rigidly and/or permanently.

In the scope of another embodiment of the invention, it can be provided that, when there is a switch from the auxiliary assembly operation to the starting operation, the first shift clutch is at least partially engaged for starting the internal combustion engine and, when the second sub-transmission is engaged, the second shift clutch is at least partially engaged. As a result of engaging the two shift clutches, the torque provided by the electric machine is used not only for driving the auxiliary assembly, but also, at the same time, for providing the starting torque at the internal combustion engine and the drive torque at the output shaft. For this purpose, the second sub-transmission is engaged, namely, before the second shift clutch is at least partially engaged. In the scope of the coupling of the second sub-transmission, a gear is engaged, in particular a starting gear. The described procedural approach has the advantage that, without any interruption in operation of the auxiliary assembly, a smooth startup of the motor vehicle is implemented.

An enhancement of the invention provides that the engaging of the second shift clutch occurs after the engaging of the first shift clutch. Through the engaging of the first shift clutch, the starting of the internal combustion engine is initiated in that the torque is applied to it. In order to prevent too rapid a rise in the torque required by the electric machine, the rotational speed of the internal combustion engine should initially be somewhat increased before the second shift clutch is engaged for startup of the motor vehicle.

Preferably, the second shift clutch is engaged when the rotational speed of the internal combustion engine is greater than zero, but is smaller than the idling speed. For example, the second shift clutch is engaged at a rotational speed of the internal combustion engine that is different from zero and corresponds to at most 10%, at most 20%, at most 30%, at most 40%, or at most 50% of the idling speed of the internal combustion engine. By use of a procedural approach of this kind, an excessive load on the electric machine is reliably prevented.

Another preferred embodiment of the invention provides that, in the starting operation, after the starting of the internal combustion engine, the drive torque is provided at least intermittently by the internal combustion engine and the electric machine. If both the first shift clutch and the second shift clutch are engaged, then the torque provided by the electric machine via the first shift clutch is also provided at the second shift clutch.

Because the second shift clutch is likewise engaged, the torque is provided by the electric machine via the first shift clutch, the second shift clutch, and the engaged second sub-transmission directly onto the output shaft. In order to further accelerate the startup of the motor vehicle, the electric machine is further operated with an engaged first shift clutch even after the starting of the internal combustion engine, so that the torque applied from the output shaft is provided jointly by the internal combustion engine and the electric machine.

A preferred embodiment of the invention provides that, as a first sub-transmission, a sub-transmission with a smaller minimum gear ratio than that of the second sub-transmission is used. Both sub-transmissions are designed as gearshift transmissions and therefore each make possible the adjustment of different gear ratios. In this case, the gear ratios, which, in turn, are assigned to the gears of the dual clutch transmission, are stepped between the two sub-transmissions. For example, the first sub-transmission has the odd gears of the dual clutch transmission, that is, at least one first gear, and the second sub-transmission has all even gears, that is, at least one second gear. The first gear has the smallest gear ratio of the dual clutch transmission. Therefore, if a procedural approach described in the scope of this description is carried out, then the startup occurs, for example, in the second gear of the dual clutch transmission, that is, at least not in the first gear, which has the minimum gear ratio of the dual clutch transmission.

For example, it can be provided that, depending on the operational state of the auxiliary assembly, different kinds of starting operations are carried out. If, when the internal combustion engine is switched off, the auxiliary assembly is driven by means of the electric machine, then a first kind of driving operation is carried out. In said driving operation, the procedural approach explained in the scope of this description is carried out, so that a continuous driving of the auxiliary assembly takes place by means of the electric machine.

If, in contrast, the auxiliary assembly is not in operation, then a second kind of driving operation can be carried out. In said driving operation, for example, the internal combustion engine is initially started by means of the electric machine and subsequently the drive torque is provided at the output shaft by means of the internal combustion engine. Alternatively, it can also be provided that, at the same time, the internal combustion engine is used to drive the output shaft and the generator, and the motor is employed for additional driving of the output shaft. In this case, an especially rapid acceleration of the motor vehicle is made possible.

Another preferred embodiment of the invention provides that, for a gear shift of the dual clutch transmission during the starting operation, the first shift clutch is disengaged, the first sub-transmission is engaged, and subsequently, the first shift clutch is engaged and the second shift clutch is disengaged. The startup of the motor vehicle occurs, in accordance with the preceding discussions, initially via the second shift clutch, by way of which the internal combustion engine is coupled to the output shaft. The second sub-transmission is engaged, so that a specific gear is set at it, in particular the gear with the smallest gear ratio of the second sub-transmission.

If the gear ratio or the gear shall now be shifted, then the startup of the motor vehicle is continued solely by means of the internal combustion engine and, for this purpose, the electric machine is disengaged from the output shaft. Subsequently, the first sub-transmission is engaged and then the first shift clutch is engaged and the second shift clutch is disengaged. Prior to the coupling of the first sub-transmission, the electric machine is preferably used for synchronizing the first sub-transmission; that is, the first input shaft is brought up to a rotational speed that makes it possible to engage the first sub-transmission as intended. The described procedural approach makes it possible to continue the startup of the motor vehicle with, at the same time, ongoing operation of the auxiliary assembly.

Another embodiment of the invention provides that, in the starting operation during the driving of the output shaft by means of the electric motor, the second shift clutch is only partially engaged. Accordingly, only a part of the torque provided by means of the internal combustion engine is employed in the form of the drive torque for driving the output shaft. The remaining part of the provided torque is used for driving the generator. Preferably, the generator is adjusted in such a way that the second shift clutch is slip-free, even though it is only partially engaged. For this purpose, for example, a torque regulation of the generator is carried out, with a difference in rotational speed via the second shift clutch being used as a control variable. This makes possible an especially low wear of the second shift clutch, in spite of the high drive torque provided at the output shaft.

Finally, in the scope of another preferred embodiment of the invention, it can be provided that, in the starting operation, the generator is coupled to the internal combustion engine in a rotationally rigid manner or the electric machine is used as a generator. Reference to this has already been made. For example, the generator is arranged on the sides of the internal combustion engine relative to the shift clutches. For example, the generator is permanently connected to the internal combustion engine in a rotationally rigid manner. However, it can also be provided that, between the generator and the internal combustion engine, there is another shift clutch, which is designed, in particular, as a starting clutch. Alternatively, it is possible—in accordance with the preceding discussions—to use the electric machine as a generator, with the electric machine being coupled to the first input shaft, preferably rigidly and/or permanently. Both embodiments make possible the rapid startup of the motor vehicle.

The invention further relates to a drive device for a motor vehicle, in particular for carrying out the method in accordance with the discussions in the scope of this description, with an internal combustion engine and a dual clutch transmission, wherein the dual clutch transmission has a first input shaft, a second input shaft, and an output shaft, and the first input shaft is connected via a first sub-transmission, and the second input shaft is connected via a second sub-transmission to the output shaft, and wherein the internal combustion engine is connected via a first shift clutch to the first input shaft and via a second shift clutch to the second input shaft.

In this case, it is provided that, in a starting operation of the drive device directed at a startup of the motor vehicle, an electric machine coupled to the first input shaft is used, when the first shift clutch is at least partially engaged and the first sub-transmission is disengaged and when the second shift clutch is at least partially engaged and the second sub-transmission is engaged, for providing at the output shaft a starting torque used for starting the internal combustion engine and a drive torque directed at startup of the motor vehicle, and/or that, in the starting operation, the internal combustion engine is operated, when the second shift clutch is at least partially engaged and the second sub-transmission is engaged, for driving an electric generator and for providing the drive torque at the output shaft, and electrical energy supplied by means of the generator is used for additional driving of the output shaft by an electric motor coupled to the output shaft.

Reference has already been made to the advantages of a procedural approach of this kind or such an embodiment of the drive device. Both the drive device and the method for its operation can be further developed in accordance with the discussions in the scope of this description, so that in this regard, reference is made to said discussions. The drive device is provided and designed for carrying out the described method.

BRIEF DESCRIPTION OF THE DRAWING

The invention will be explained below in more detail on the basis of the exemplary embodiments illustrated in the drawing, without any limitation of the invention thereby occurring. In this case, the FIGURE(S) show:

FIG. 1 a schematic illustration of a drive device for a motor vehicle, wherein an auxiliary assembly is driven by means of an electric machine.

DETAILED DESCRIPTION

FIG. 1 shows a schematic illustration of a drive device 1 for a motor vehicle. The drive device 1 has a internal combustion engine 2 as well as a dual clutch transmission 3. The dual clutch transmission 3 is equipped, in turn, with a first input shaft 4, which can be coupled via a first sub-transmission 5 to an output shaft 6 of the dual clutch transmission 3, namely, when the first sub-transmission 5 is coupled; that is, a gear is engaged at the first sub-transmission 5. Furthermore, the dual clutch transmission 3 is equipped with a second input shaft 7, which is connected via a second sub-transmission 8 to the output shaft 6. The second input shaft 7 is operatively coupled to the output shaft 6 when the second sub-transmission is engaged; that is, a gear is engaged at the second sub-transmission 8.

The first input shaft 4 can be coupled to the internal combustion engine 2 via a first shift clutch 9. Analogously, for this purpose, the second input shaft 7 can be coupled to the internal combustion engine 2 via a second shift clutch 10. For example, the shift clutches 9 and 10 are each connected at the input end to the internal combustion engine 2, preferably rigidly and/or permanently. At the output end, the shift clutches 9 and 10 are coupled to the respective input shaft 4 or 7, namely, rigidly and permanently. It can be provided that, between the shift clutches 9 and 10 and the internal combustion engine 2, there is another shift clutch 11. Said clutch can be designed as a starting clutch. The shift clutch 11 is optional, however.

The drive device 1 is equipped with an auxiliary drive 12, which, in turn, has at least one auxiliary assembly 13. The auxiliary assembly 13 can be driven by means of the internal combustion engine 2. For this purpose, said auxiliary assembly is coupled to the first input shaft 4, preferably rigidly and/or permanently. In the exemplary embodiment illustrated here, the auxiliary assembly 13 is connected to the first input shaft 4 via a gear step 14. Further illustrated are an electric machine 15, an electric generator 16, and an electric motor 17.

It may be provided that the electric machine 15, the generator 16, and the motor 17 are all present. It may also be provided, however, that the electric machine 15 is present, whereas the generator 16 and the motor 17 are dispensed with. Conversely, it can be provided that the electric machine 15 is dispensed with, but the generator 16 and the motor 17 are components of the drive device 1. This notwithstanding, all of the named elements are included in the scope of this description.

The electric machine 15 is coupled to the first input shaft 4, preferably rigidly and/or permanently, in particular, via a gear step 18. The electric machine 15 serves, among other things, for driving the auxiliary assembly 13, in particular, when the internal combustion engine 2 is at a standstill. The generator 16 can be driven by means of the internal combustion engine 2. Said generator is connected, for example, via the shift clutch 11 or—alternatively—directly to the internal combustion engine 2 or coupled to it. The motor 17, in contrast, serves for driving the output shaft 6, and, for this purpose, is coupled to it, preferably rigidly and/or permanently.

It can then be provided, in a starting operation of the drive device directed at a startup of the motor vehicle 1, when the first shift clutch 9 is at least partially engaged and the first sub-transmission 5 is disengaged, and when the second shift clutch 10 is at least partially engaged and the second sub-transmission 8 is engaged, to use the electric machine 15 coupled to the first input shaft 4 for providing a starting torque used for starting the internal combustion engine 2 and a drive torque directed at startup of the motor vehicle at the output shaft 6.

More preferably, is it provided that, when the internal combustion engine 2 is at a standstill, an auxiliary assembly operation is initially carried out, in which the auxiliary assembly 13 is driven by means of the electric machine 15, with the first shift clutch 9 being disengaged and the first sub-transmission 5 being disengaged. During the startup of the motor vehicle, the auxiliary assembly 13 is to be further driven by means of the electric machine 15. At the same time, the electric machine 15 serves for starting the internal combustion engine 2. For this reason, the first shift clutch 9 is at least partially engaged, so that, at the internal combustion engine 2, the starting torque is provided by means of the electric machine 15. In addition, the second sub-transmission 8 is engaged, that is, a gear is engaged at the second sub-transmission 8 if this was not already the case.

Afterwards, the second shift clutch 10 is likewise partially engaged, so that the output shaft 6 is driven by means of the electric machine 15. In this starting operation, therefore, the auxiliary assembly 13 is further driven by means of the electric machine 15, and, at the same time, the torque provided by the electric machine 15 is employed for starting the internal combustion engine 2 and for startup of the motor vehicle. Accordingly, when the auxiliary assembly 13 is further operated, a rapid startup of the motor vehicle is realized.

Additionally or alternatively, it can be provided in the starting operation that, when the second shift clutch 10 is at least partially engaged and the second sub-transmission 8 is engaged, the internal combustion engine 2 is operated for driving the electric generator 16 and for providing the drive torque at the output shaft 6, and energy supplied by means of the generator 16 is used for the additional driving of the output shaft 6 by way of the electric motor 17 coupled to the output shaft 6.

In other words, a part of the torque provided by the internal combustion engine 2 is transmitted directly via the dual clutch transmission 3 and is available at the output shaft 6. Another part of the torque provided by the internal combustion engine 2 is taken up by the generator 16 for supplying electrical energy. The electrical energy supplied in this way is used for driving the motor 17, which, in addition, drives the output shaft 6. In this regard, only a part of the torque provided by the internal combustion engine 2 is transmitted via the dual clutch transmission 3, in particular, via the second shift clutch 10.

This ultimately means that, at the output shaft 6, it is possible to provide a drive torque that is greater than a selection torque of the second shift clutch 10. It should be noted that the described procedural approach can also be carried out by means of the first shift clutch 9 or the first sub-transmission 5. The exemplary embodiment illustrated here was focused on the second shift clutch 10 and the second sub-transmission 8 solely by way of example.

The invention claimed is:

1. A method for operating a drive device for a motor vehicle with an internal combustion engine and a dual clutch transmission, wherein the dual clutch transmission has a first input shaft, a second input shaft, and an output shaft, and the first input shaft is connected via a first sub-transmission with an engaged and disengaged state and the second input shaft is connected via a second sub-transmission with an engaged and disengaged state to the output shaft, and wherein the internal combustion engine is connected via a first shift clutch to the first input shaft and via a second shift clutch to the second input shaft, comprising:
   in a starting operation of the drive device directed at a startup of the motor vehicle, an electric machine coupled to the first input shaft is used, when the first shift clutch is at least partially engaged and the first sub-transmission is disengaged, and when the second shift clutch is at least partially engaged and the second sub-transmission is engaged, for providing at the output shaft a starting torque used for starting the internal combustion engine and a drive torque directed at startup of the motor vehicle, or wherein, in the starting operation, the internal combustion engine is operated, when the second shift clutch is at least partially engaged and the second sub-transmission is engaged, for driving an electric generator and for providing the drive torque at the output shaft, and electrical energy supplied by means of the generator is used for the additional driving of the output shaft by an electric motor coupled to the output shaft,
   wherein the first sub-transmission or the second sub-transmission is in neutral when the first sub-transmission or the second sub-transmission is disengaged, and
   wherein the first sub-transmission or the second sub-transmission is engaged to a predetermined gear when the first sub-transmission or the second sub-transmission is engaged.

2. The method according to claim 1, wherein, in an auxiliary assembly operation, at least one auxiliary assembly is driven by the electric machine when the shift clutch is disengaged and the first sub-transmission is disengaged.

3. The method according to claim 1, wherein, when there is a switch from an auxiliary assembly operation to the starting operation, the first shift clutch for starting the internal combustion engine is at least partially engaged and the second shift clutch, when the second sub-transmission is engaged, is at least partially engaged.

4. The method according to claim 1, wherein the engaging of the second shift clutch occurs after the engaging of the first shift clutch.

5. The method according to claim 1, wherein, in the starting operation after starting the internal combustion engine, the drive torque is provided at least intermittently by the internal combustion engine and the electric machine.

6. The method according to claim 1, wherein the first sub-transmission has a smaller minimum gear ratio than that of the second sub-transmission.

7. The method according to claim 1, wherein, for a gear shift of the dual clutch transmission during the starting operation, the first shift clutch is disengaged, the first sub-transmission is engaged, and subsequently the first shift clutch is engaged and the second shift clutch is disengaged.

8. The method according to claim 1, wherein, in the starting operation during the driving of the output shaft by the electric motor, the second shift clutch is only partially engaged.

9. The method according to claim 1, wherein, in the starting operation, the generator is coupled to the internal combustion engine in a rotationally rigid manner or the electric machine is used as a generator.

10. A drive device for a motor vehicle, comprising:
an internal combustion engine and a dual clutch transmission, wherein the dual clutch transmission has a first input shaft, a second input shaft, and an output shaft, and the first input shaft is connected via a first sub-transmission with an engaged and disengaged state and the second input shaft is connected via a second sub-transmission with an engaged and disengaged state to the output shaft, and wherein the internal combustion engine is connected via a first shift clutch to the first input shaft and via a second shift clutch to the second input shaft,
wherein, in a starting operation of the drive device directed at a startup of the motor vehicle, an electric machine coupled to the first input shaft is used, when the first shift clutch is at least partially engaged and when the first sub-transmission is disengaged and when the second shift clutch is at least partially engaged and the second sub-transmission is engaged, for providing at the output shaft a starting torque used for starting the internal combustion engine and a drive torque directed at the startup of the motor vehicle, or wherein, in the starting operation, the internal combustion engine, when the second shift clutch is at least partially engaged and the second sub-transmission is engaged, is operated for driving an electric generator and for providing the drive torque at the output shaft, and electrical energy supplied by the generator is used for the additional driving of the output shaft by an electric motor coupled to the output shaft,
wherein the first sub-transmission or the second sub-transmission is in neutral when the first sub-transmission or the second sub-transmission is disengaged, and
wherein the first sub-transmission or the second sub-transmission is engaged to a predetermined gear when the first sub-transmission or the second sub-transmission is engaged.

* * * * *